Dec. 13, 1955  D. L. WAUGH  2,726,976
V-BELTS AND METHOD FOR MANUFACTURING SAME

Filed July 10, 1953

INVENTOR.
D. L. WAUGH

BY
ATT'Y.

United States Patent Office 2,726,976
Patented Dec. 13, 1955

2,726,976

V-BELTS AND METHOD FOR MANUFACTURING SAME

Dale L. Waugh, Dayton, Ohio, assignor to The Dayton Rubber Company, a corporation of Ohio Application July 10, 1953, Serial No. 367,130

11 Claims. (Cl. 154—4)

The present invention relates to belts of trapezoidal cross-section, commonly known as V-belts, and particularly to such belts having a load carrying portion composed of one or more transverse layers of parallel longitudinal cords. The present invention also relates to the method for the manufacture of such belts.

Since V-belts effect power transmission by contact through their converging side driving faces in contact with the inclined sides of V-grooved pulleys, such belts are of relatively greater thickness than were the previously used flat belts of equal load carrying capacities. As a result of this increased thickness, the variation of stresses at different points along the vertical axis of the belt as it flexes in bending about a pulley has received considerable attention. In general, V-belts are said to be divided into three vertically superimposed sections depending upon the nature of the stresses occurring in the sections as the belt is flexed.

The innermost section of the belt, that is, that section of the belt positioned on the side corresponding to the direction in which the belt flexes, is placed in compression as the belt passes about a pulley and is accordingly referred to as the compression section. The outer portion of the belt away from the direction of flexure thereof is stressed and tensed as the belt bends about a pulley and is accordingly referred to as the tension section. Interposed between these two sections is an inextensible portion of high tensile strength which serves to carry the load on the belt. This load carrying portion is normally located in the vicinity of the theoretical neutral flexural axis of the belt which is the theoretical horizontal axis below which all of the belting material is compressed and above which the belting material is tensed as the belt flexes. In a belt of trapezoidal cross-section this theoretical neutral axis is located approximately one-third the thickness of the belt from the top or outer surface thereof. Where, however, the belt is composed of a low modulus, rubber-like material, the actual neutral flexural axis will be largely determined by the location of the inextensible load carrying portion, wherever it might be positioned.

In any event, it is of extreme importance that this inextensible load carrying portion extending longitudinally of the belt at a point usually within the top third of its thickness be maintained in transverse parallel alignment with the flexural axis of the belt which is, in turn, parallel to the rotational axes of the pulleys about which the belt is traveling.

It has been found that greater flexibility and the greater load carrying capacity per given thickness of the load carrying portion of the belt may be achieved if the same is composed of a plurality of parallel cords or cables which extend longitudinally of the belt. These parallel cords in the finished belt may be formed from a continuous cord or cable or may be separated at each convolution; but in any event they should be in transverse alignment parallel with the belt's flexural axis.

Where these cords are employed to form the load carrying portion of the belt, such cords, although they may be contiguous or in closely spaced transverse alignment, are sufficiently dissociated that there is nothing other than the rubber-like cushioning material in which they are embedded to preserve their relative position and particularly their desired transverse planar alignment.

At the same time, there are many factors tending to cause these cords to move from the desired and necessary transverse or horizontal alignment. For convenience of manufacture, successive convolutions are usually formed from a continuous cord, and, in order that the stretch of the cord during the use of the belt will be kept to a minimum, this cord is spun onto the belt under tension. Furthermore, in order to achieve greater flexibility, particularly in smaller belts such as are used on fractional horsepower installations, a rubber-like material is employed not only in the cushioning layers, but also in the tension and compression sections. Such materials normally include natural rubber, the various synthetic rubbers such as the butadiene-styrene copolymer known as GRS, the butadiene acrylic-nitrile copolymer known as GRA, and particularly the polychloroprenes known as neoprene and blends of these materials. Where this all-rubber-like construction is employed, and particularly where such a construction embodies cushioning material of natural rubber, neoprene, or blends of these two hydrocarbons, prolonged heating of the belting material such as is encountered in vulcanization or during prolonged usage will cause the belt material, particularly the cushioning material, to become plastic and somewhat fluid with the result that the cords might be said to be floating. It is apparent that the dissociated cords which are in a tensed state will move from their original position upon the occurrence of this plasticity of the material in which they are embedded and will accordingly become misaligned. As a result of this misalignment of the cords resulting from their traveling through the rubber-like composition, those which move nearer the inside periphery of the belt will become less tensed and will therefore not carry their proportionate share of the load with the result that the additional load will be thrown upon those cords which remain nearer the outer periphery of the belt with the result that these outer cords may become over stressed and prematurely fail, thereby throwing a still greater load upon the unbroken cords remaining in the belts to cause their early failure.

This problem of cord misalignment is particularly severe in small belts such as are used on fractional horsepower installations in that their all-rubber-like construction gives less support to the cord windings. In addition, it has been found desirable in these small belts in order to achieve greater flexibility, to employ windings of cord varying in diameter from .025" to .075". The cord of this reduced diameter has a greater tendency to cut through the rubber-like material than would larger cords.

It is accordingly an object of the present invention to provide an improved belt construction incorporating a load carrying portion of longitudinally extending, inextensible cords or cables embedded in a rubber-like composition.

It is another object of the present invention to provide a belt of sufficient flexing ability to operate satisfactorily about small pulleys such as are encountered in fractional horsepower installations.

It is a further object of the present invention to provide a belt having a tension and compression section of rubber-like material and an intermediate load carrying portion of longitudinally extending flexible and inextensible cords or cables, the transverse alignment of which may be maintained substantially coincident with or parallel to the theoretical line of neutral flexure horizontally of the belt.

It is yet a further object of the present invention to provide a method for the manufacture of improved belts having a load carrying portion of longitudinally extending inextensible cords positioned between tension and compression sections of elastomeric composition.

These and other obvious objects and advantages to be apparent from a reading of the following disclosure are to be achieved by enclosing the strength band or load carrying portion of these belts between fabric layers which are so positioned with relation to the strength cords that the flow of the rubber-like material surrounding them will be prevented, their movement through this rubber-like material will be substantially prevented, and their transverse alignment coincident with or parallel to the theoretical neutral axis of the flexure will be maintained. The fabric layers encasing the neutral axis portion of the belt will not actually contact the longitudinal cords, but rather will envelope and confine the rubber-like composition in which these cords are embedded, thereby preventing the flow of this rubber-like composition (as it becomes heated during vulcanization or prolonged usage of the belt) and thus indirectly holding the longitudinal cords in their proper transverse alignment.

In connection with the following detailed description in which the particular objects, advantages and features of the present invention will be more clearly illustrated, reference may be had to the appended drawings.

Figure 1:
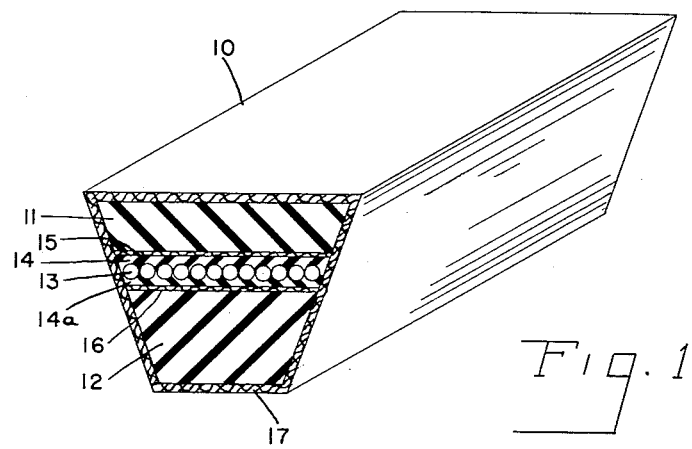
Figure 1 is a view in perspective and partial cross section of a typical V-belt incorporating the features of the present invention.

In Figure 1, reference numeral 10 designates generally a power transmission belt of trapezoidal cross section incorporating an outer or upper tension section 11 of elastomeric composition, an inner or lower compression section 12 of a similar rubber-like material, between which sections is interposed the load carrying portion comprising the longitudinally extending cords or cables 13, embedded in cushioning layers 14 and 14a of rubber-like composition similar to that employed in the tension and compression sections previously described, and enveloping flow control layers 15 and 16 of a bias cut rubberized fabric. The belt core thus described is usually completely surrounded by a rubberized fabric cover 17 which may consist of one or more layers of rubberized fabric usually cut on the bias and spliced by lap joints extending longitudinally of the belt.

Figure 2:
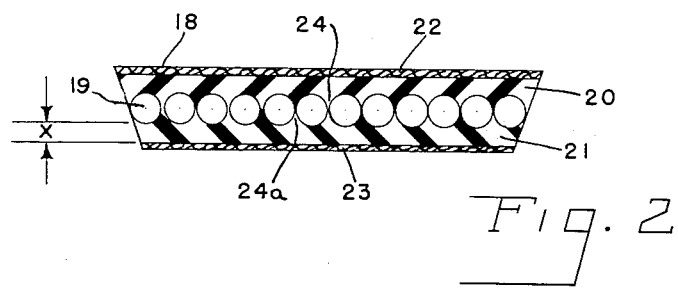
Figure 2 is a cross-sectional view of a typical load carrying portion of a V-belt showing in greater detail the features of the present invention.

The improvements made on a belt such as that described in the preceding paragraph and incorporating the features of the present invention are best shown in Figure 2 where only that portion of a belt representing its strength portion or longitudinal cord line area is shown in enlarged proportions. Such longitudinal cord area is designated generally at 18 and comprises the longitudinally extending cords 19 which may or may not be contiguous as shown. These cords are embedded between layers of rubber-like material usually referred to as cushion layers 20 and 21. While these layers are of a uniform gauge upon their application to the belt material, during the building and vulcanizing of the belt, they will, of course, flow to the extent that they will completely surround and envelope the cords 19. Above and below the cords embedded in the rubber as previously described are positioned flow control fabric layers 22 and 23. It is the purpose of these flow control layers to so confine the rubber of the cushion layers 20 and 21 that, as they become plastic during vulcanization or use, they will not flow to the extent that the cords 19 will move from their aligned position.

In order that this flow control may be effective, it is of course, necessary that the flow control layers 22 and 23 be positioned in rather close proximity to the line of cords 19. At the same time, however, in order that a satisfactory adhesive bond be obtained between the cords and the remainder of the belt through their adhesion to the rubber-like material forming the cushion layers 20 and 21, it has been found essential that the fabric layers 22 and 23 do not actually contact these cords. In accordance with the present invention, therefore, these fabric layers 22 and 23 must be carefully positioned with relation to the cords 19 so that proper adhesion of the cords to the rubber may be achieved, while at the same time the desired flow control properties will not be seriously diminished. While layers 22 and 23 are shown to be equally spaced from the cords 19, one may be closer thereto than is the other. Since the greater tendency is for the cords to move inwardly, the layer 23 may be located nearer the cords than is layer 22.

It has been found that a volume of rubber equal in cross-sectional area to .2147 of the square of the diameter of each of the cords such as those shown at 19 would be required to fill the troughs formed along the points of contact between adjacently positioned cords 19. Such troughs will, of course, be formed above and below the horizontal axes of the cords as shown at 24 and 24a. It follows that ½ of the above described volume will be required above and below the cords and such volume may be provided by a theoretical layer of rubber equal in thickness to .1073 the diameter of the cords. While the individual cords may be transversely spaced thus requiring more rubber to fill the spaces between them, it is desirable to have them contiguously arranged and the stated volume is the minimum required in such instances.

It has been found further that in order to provide a proper backing for the cushioning composition thus filling the troughs 24 and 24a so as to provide for a satisfactory distribution of stresses and to prevent separation of the cushioning layer along longitudinal lines conforming to the upper and lower points upon the circumference of the respective cords, an additional amount of rubber equal in thickness to ⅙ the diameter of the cords is required. Accordingly, the belt should be so constructed in its longitudinal cord area that the flow control fabric layers such as 22 and 23 should be spaced from the upper and lower common tangent of the aligned cords by a distance equal to not less than ⅙ the diameter of these cords. Such distance is represented at X in Figure 2. Where the layer of cushioning material separating the flow control fabric from the nearest common tangent to the cords is not less than the minimum thickness equal to ⅙ of the cord diameter, sufficient cushioning is provided to enable the belt to absorb normal shock loading and to prevent the adjacent cords from abrading each other. As previously explained, the layer of this minimum thickness will also provide sufficient backing to prevent longitudinal separation of the cushioning material above the center of the cords. On the other hand, care must be taken to locate the fabric layers sufficiently close to the cords that their flow control effect will not be lost. Accordingly, each fabric layer should be spaced from the nearest common tangent to the cords not more than a distance equal to ½ of the cord diameter.

In the manufacture of belts such as those previously described in connection with Figures 1 and 2 above, the belt material to comprise the respectively enumerated sections is ordinarily built up in laminated form by winding such material about a suitable building mandrel. The rubber-like compression section such as 12 of Figure 1 would be first wound upon the mandrel whereafter fabric layer 15, a layer of the cushioning material 14, the cords 13, a second layer of cushioning material 14a, the second flow control fabric layer 16 and finally the tension layer 11 are applied in that order. The laminated sleeve of belting material thus formed is cut into suitably shaped annular portions which may be wrapped in the rubberized fabric sheaths or covers 17 and thereafter vulcanized in any of the well known manners. The cushion layers such as 20 and 21 in Figure 2 should be equal to a thickness not less than .2739 the diameter of the cords 19 so that as the necessary portion of this layer flows to fill the troughs such as 24 and 24a between these cords, a continuous layer equal in thickness to at least ⅙ the diameter of the cord will remain between them and the flow control fabric layers such as 22 and 23. In order that the desired flow control effect of the fabric layers such as 22 and 23 will not be lost, the cushion layers as they are applied in the building process should not exceed a thickness larger than .6073 of the diameter of the cords 19 so that a maximum thickness of rubber cushioning material not in excess of ½ of the cord diameter will remain between the common tangent to the cords and the flow control fabric layers. Where the cords are spaced, as opposed to contiguously positioned, the thickness of each of the cushioning layers will of course have to be increased to compensate for the filling of the additional space.

In order to achieve the desired flexibility of the finished belt, it is often desirable to employ a rubber-like composition having a Mooney viscosity of less than 30, which figure is taken from a Mooney viscometer employing the large rotor thereof at scorching temperatures of 250 degrees F. after 4 minutes. Where these low Mooney compositions are employed in the tension or compression section of the belt and particulraly in the cushioning section thereof, the improvement resulting from the application of the principles of the present invention is particularly outstanding. The principles of this invention are equal desirable where a slow curing rubber-like material is employed in any of these sections in that the movement of the longitudinal cords away from their proper transverse alignment will be greater where the rubber-like composition in which they are embedded is maintained in a plastic state for a longer period of time. The flow control fabric layers of this invention also find important applications where the belts are vulcanized in a rag wrapped ring mold as opposed to a vulcanizing press. In the former, the outer surface of the belts are surrounded by a cross wrapping of fabric which is usually wet at the beginning of the vulcanizing cycle. As a result the top or outer portion of the belts are the last to take a set during the vulcanization with the result that the rubber-like material immediately surrounding the longitudinal cords will be in a plastic state and subject to the distorting effect resulting from the release of internal stresses imparted during the building processes to the other parts of the belt.

The fabric layers such as 15, 16, 22, 23, 28 and 31 are preferably coated or impregnated with a rubber or rubber-like material to provide them with sufficient tackness to be properly adhered to the remainder of the belt material during the building application and to become integrated therewith upon vulcanization. The fabric itself is preferably plain woven having substantially the same weight and number of threads in both the warp and weft direction, since it has been found that such fabric has improved damming properties thus enhancing its flow control effectiveness. Furthermore, this square woven fabric should be cut and laid on the bias, that is, with its threads at an angle to the longitudinal axis of the belt so that the greatest flexibility may be achieved in the finished product. Cotton or the various synthetic fibers such as rayon, nylon and the like in staple lengths or continuous filaments may be employed in the fabric of the flow control layers.

Figure 3:
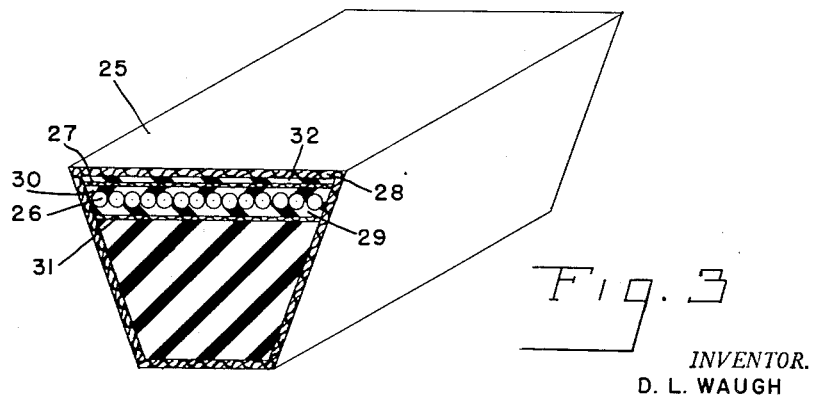
Figure 3 is a view in perspective and partial cross section of a modified belt according to the present invention.

Referring now to Figure 3, there is shown a modified belt incorporating the features of this invention, said modification being adapted for use where the belts will operate against a "backside," reversely rotating idler pulley, which pulley has a flat surface which will come in contact with the upper flat surface of the belt. In order that this upper flat surface such as 25 in Figure 3 might be sufficiently supported that it will not lose its linear configuration in parallel with the neutral axis arrangement, it will be seen that the longitudinally extending cords 26 are raised to very near the upper surface of these belts so that the upper flow control fabric layer 27, spaced in relation to the cords 26 in the manner described above, is substantially adjacent to the fabric comprising the belt cover 28. Thus, the rubber-like cushioning material in layers 29 and 30 enclosed between the flow control fabric layers 27 and 31 lends its additional support to the upper flat surface of the belt thereby facilitating its uniform contact with the flat idler pulley.

Where this modified structure is employed in a fabric wrapped or covered belt, the cover forming the top surface of the belt cooperates with the upper flow control fabric layer to restrict the flow of the thin rubber-like layer 32 immediately underlying the cover, thus adding further stability to the cushioning material and the longitudinal cords embedded therein. At the same time, the concentration of the cord and fabric layers at the upper portion of the belt tends to increase its cross wise rigidity thereby preventing its wedging too deeply into the grooves of the pulleys about which it is operating.

Although the present invention has been set forth above in particular detail, it is to be understood that all references to specific embodiments and examples are for purposes of description only and are in no way intended to limit the scope of the present invention as it is particulraly defined by the subjoined claims.

I claim:

1. A V-belt having an inner compression section of rubber-like material, an outer tension section of rubber-like material and an intermediate load carrying portion which comprises a plurality of parallel transversely aligned longitudinally extending cord windings arranged in the same plane and a cushion portion of elastomeric material within which said cord windings are embedded, said load carrying portion being enclosed by upper and lower fabric layers contiguous with the upper and lower surfaces of said cushion portion and parallel with the transverse alignment of said cord windings, whereby the flow of the elastomeric cushioning material is prevented and the transverse alignment of the cord windings is maintained in the same plane, wherein the transverse alignment of said cord windings is parallel to the theoretical neutral flexural axis of the belt, but outwardly thereof so that the upper of said flow control fabric layers is substantially adjacent to the upper surface of the belt.

2. A V-belt having a rubber-like inner compression section, a rubber-like outer tension section, and an intermediate load carrying portion which comprises a plurality of parallel transversely aligned longitudinally extending cord windings arranged in the same plane, and a cushion portion of elastomeric material having a Mooney viscosity of less than 30 at a temperature of 250° F. within which said cord windings are embedded, said load carrying portion being enclosed by upper and lower fabric layers contiguous with the upper and lower surfaces of said cushion portion and parallel with the transverse alignment of said cord windings whereby the flow of the elastomeric cushioning material is prevented and the transverse alignment of the cord windings is maintained in the same plane, wherein said cord windings are substantially contiguous and said fabric layers are spaced from the nearest common tangent to said cord windings by a distance not less than one sixth and not more than one half the diameter of said cord.

3. A belt according to claim 2 wherein the elastomeric composition of said cushion portion is a polychloroprene.

4. A belt according to claim 2 wherein the elastomeric composition of said cushion portion is a natural rubber.

5. A belt according to claim 2 wherein the elastomeric composition of said cushion portion is a blend of natural and polychloroprene rubbers.

6. A V-belt having an inner compression section, an outer tension section and an intermediate load carrying portion which comprises a plurality of transversely aligned windings of longitudinal cord and a cushion section within which said cord windings are embedded wherein the rubber portion of all of said sections is composed of a polychloroprene compound and said load carrying portion is confined along the upper and lower surfaces thereof by layers of fabric impregnated with polychloroprene, which layers are adjacent the upper and lower surfaces of said cushion section and lie parallel with the transverse alignment of said cord windings whereby the flow of the polychloroprene surrounding the cord windings is prevented and their transverse alignment is maintained.

7. A V-belt according to claim 6 wherein the distance between each of said layers of fabric and the nearest common tangent to said transversely aligned cords is within from ⅙ to ½ the diameter of said cords.

8. A V-belt comprising an inner compression section of elastomeric material, an outer tension section of a similar elastomeric material, an intermediate cushion portion of elastomeric composition positioned between said compression section and tension section, a plurality of parallel longitudinally extending cords transversely aligned within said cushion portion, fabric flow control layers above and below said cushion portion adjacent to the boundaries thereof and parallel with the transverse alignment of said cords, and a fabric cover completely surrounding the laminated belt thus constructed wherein said elastomeric material is polychloroprene and the elastomeric composition of the cushion portion is completely confined between the flow control fabric layers on the top and bottom and the fabric cover on the sides thereof whereby the flow of this material and shifting of the cords is prevented.

9. A belt according to claim 8 wherein said cords are transversely aligned parallel to the flexural axis of the belt but outwardly thereof so that one of said flow control fabric layers is in closely spaced relation with the fabric cover forming the upper surface of the belt.

10. A method for the manufacture of V-belts comprising superimposing a layer of elastomeric compression stock, a layer of fabric, a layer of elastomeric cushioning material, a layer of longitudinal cord windings, a second layer of an elastomeric cushioning material, a second layer of fabric and a layer of elastomeric tension stock and subjecting this laminated structure to vulcanization and consolidating the respective layers into a unitary body, the elastomeric material of at least said cushioning layers having a Mooney viscosity of less than 30 at a temperature of 250° F. and the thickness of said cushioning layers at the time they are applied to the belt structure ranging from .2739 to .6073 times the diameter of said longitudinal cord.

11. A V-belt having an inner compression section, an outer tension section and an intermediate load carrying portion which comprises a plurality of transversely aligned windings of longitudinal cord and a cushion section within which said cord windings are embedded wherein the rubber portion of all of said sections is composed of an elastomeric composition having a Mooney viscosity of less than 30 at 250° F. and said load carrying portion is confined along the upper and lower surfaces thereof by layers of fabric impregnated with an elastomeric composition, which layers are adjacent the upper and lower surfaces of said cushion section and lie parallel with the transverse alignment of said cord windings whereby the flow of the elastomeric composition surrounding the cord windings is prevented and their transverse alignment is maintained.

References Cited in the file of this patent

UNITED STATES PATENTS

| | | |
|---|---|---|
| 1,920,482 | Toulmin, Jr. | Aug. 1, 1933 |
| 1,924,355 | Freedlander | Aug. 29, 1933 |
| 2,281,148 | Freedlander | Apr. 28, 1942 |
| 2,336,084 | Freedlander | Dec. 7, 1943 |
| 2,411,027 | Crosby | Nov. 12, 1946 |
| 2,491,188 | Lesesne | Dec. 13, 1949 |
| 2,655,195 | Curtis | Oct. 13, 1953 |
| 2,661,045 | Huber | Dec. 1, 1953 |